US012574257B2

(12) United States Patent
Wegehenkel et al.

(10) Patent No.: US 12,574,257 B2
(45) Date of Patent: Mar. 10, 2026

(54) SMART HEATER SYSTEM FOR BATHING INSTALLATIONS INCLUDING SPAS

(71) Applicant: Balboa Water Group, LLC, Costa Mesa, CA (US)

(72) Inventors: Chris Lee Wegehenkel, Huntington Beach, CA (US); David W. Morris, Placentia, CA (US); Charles Joseph Heiden, Mission Viejo, CA (US); Hoang Bui, Jurupa Valley, CA (US)

(73) Assignee: Balboa Water Group, LLC, San Diego, CA (US)

( * ) Notice: Subject to any disclaimer, the term of this patent is extended or adjusted under 35 U.S.C. 154(b) by 204 days.

(21) Appl. No.: 18/368,560

(22) Filed: Sep. 14, 2023

(65) Prior Publication Data

US 2024/0305478 A1 Sep. 12, 2024

Related U.S. Application Data

(60) Provisional application No. 63/450,354, filed on Mar. 6, 2023.

(51) Int. Cl.
*H04L 9/32* (2006.01)
*G06F 21/72* (2013.01)
*H05B 3/02* (2006.01)

(52) U.S. Cl.
CPC ............ *H04L 9/3271* (2013.01); *G06F 21/72* (2013.01); *H05B 3/02* (2013.01)

(58) Field of Classification Search
CPC ........ G06F 21/32; G06F 21/602; G06F 21/73; H04L 9/0866; H04L 9/0869; H04L 9/3278; H04L 63/062; H04L 63/0861; H04L 9/3231
See application file for complete search history.

(56) References Cited

U.S. PATENT DOCUMENTS

| | | | |
|---|---|---|---|
| 7,042,346 | B2 | 5/2006 | Paulsen |
| 8,396,356 | B2 | 3/2013 | Perry et al. |
| 8,669,494 | B2 | 3/2014 | Tran |
| 9,158,939 | B2 | 10/2015 | Yoshimi |

(Continued)

OTHER PUBLICATIONS

European Patent Search Report, Jun. 13, 2024, 24161239.9, 8 pages.

*Primary Examiner* — Izunna Okeke
(74) *Attorney, Agent, or Firm* — Larry K. Roberts

(57) ABSTRACT
A bathing installation system includes a controller configured to communicate with one or more sensors, and interfaces, and is electrically connected to load devices of the bathing installation, the load devices including a heater. The controller is configured to generate a host authentication query for transmission to the heater, and to receive heater authentication responses received in response to the host authentication query. The heater includes a heater element and a client authentication IC configured to receive the authentication query from the controller and to generate a heater authentication response in response to the received authentication query. The controller system is configured to enable normal operation of the heater if the received heater authentication response matches the host authentication response, and, if not, to generate a notification to a bathing installation user that the heater is not an authentic heater or other action.

15 Claims, 3 Drawing Sheets

(56)               References Cited

U.S. PATENT DOCUMENTS

| | | | |
|---|---|---|---|
| 9,334,820 | B2 | 5/2016 | Komine et al. |
| 10,795,986 | B2 | 10/2020 | Louco et al. |
| 11,429,709 | B2 | 8/2022 | Russell et al. |
| 11,429,710 | B2 | 8/2022 | Rooyakkers et al. |
| 11,759,391 | B2 | 9/2023 | Laflamme |
| 12,001,539 | B2 | 6/2024 | Russell et al. |
| 2003/0236998 | A1 | 12/2003 | Gilstrap et al. |
| 2005/0001589 | A1 | 1/2005 | Edington et al. |
| 2008/0041839 | A1 | 2/2008 | Tran |
| 2008/0159534 | A1 | 7/2008 | Rager et al. |
| 2015/0123255 | A1 | 5/2015 | Palm |
| 2019/0116179 | A1* | 4/2019 | Xu ........................ H04L 9/3226 |
| 2024/0012374 | A1* | 1/2024 | Bauckman ............. G05B 15/02 |

* cited by examiner

SMART HEATER SYSTEM FOR BATHING INSTALLATIONS INCLUDING SPAS

CROSS-REFERENCE TO RELATED APPLICATION

This application claims priority to U.S. Provisional Patent Application No. 63/450,354, filed Mar. 6, 2023, the entire contents of which are incorporated herein by this reference.

BACKGROUND

The spa industry has been growing at a high rate before, during, and after the pandemic, with more and more people seeking a safe and relaxing experience in the comfort of their own homes. However, this growth has also led to an increase in the production and sale of counterfeit spa heaters, posing a significant safety risk to users. While there are many spa heaters available in the market, none of them can prevent counterfeiting effectively. Embodiments of this invention provide a much-needed solution to this problem.

Currently, all spa heaters in the market are very easy to copy, making it difficult for manufacturers to protect their products from counterfeiters. These counterfeit heaters are often produced with subpar materials, and they may not function correctly, leading to safety concerns for users.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

The figures are not to scale, and relative feature sizes may be exaggerated for illustrative purposes.

U.S. Pat. Nos. 8,396,356 B2 and 8,669,494 B2 describe spa systems and spa heaters; the entire contents of these US patents are incorporated herein by this reference. These describe spas with spa controllers and electrically powered heaters for heating the spa water.

Figure 3:
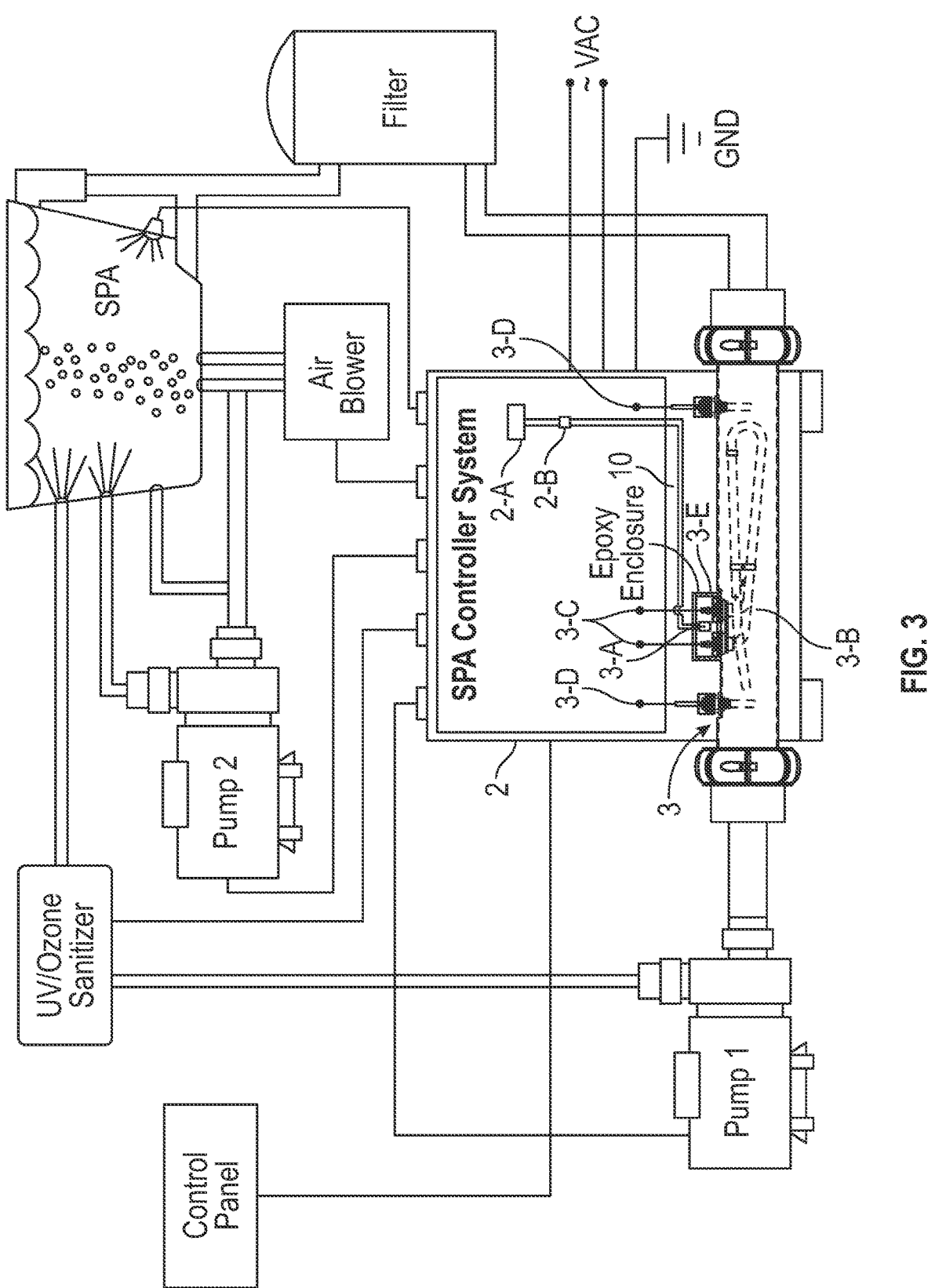
FIG. 3 is a schematic diagram of an exemplary spa system employing an exemplary embodiment of a smart heater.

FIG. 3 illustrates an overall block diagram of an exemplary embodiment of a spa system. The system includes a vessel for holding a volume of water, and a control system 2 to activate and manage the various parameters of the spa. An electric heater 3 maintains the temperature of the spa at a temperature set by the user, under control of the spa control system.

Figures 1, 2:
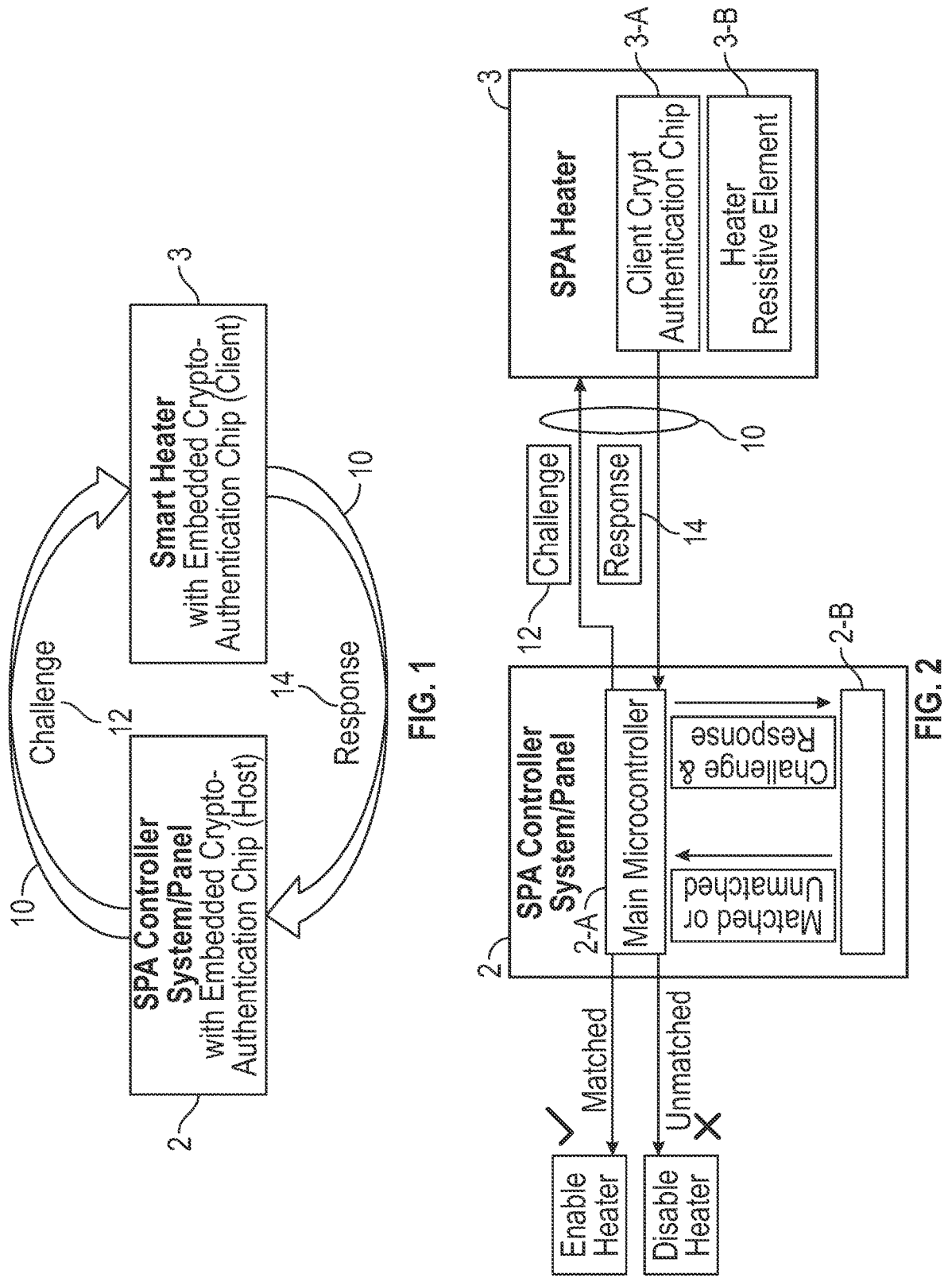
FIG. 1 is a diagrammatic schematic view illustrating an exemplary embodiment of aspects of a spa control system employing a smart heater in accordance with aspects of the invention.
FIG. 2 is a diagrammatic schematic view illustrating an exemplary embodiment of an authentication process employed by the spa system of FIG. 1.

FIGS. 1 and 3 illustrate a spa controller system 2 operating to control operation of a smart heater 3 for the spa. The smart spa heater 3 communicates with the spa controller system 2 (sometimes referred to as a "spa pack"), over an interface 10 with serial communication. The spa controller system includes a microcontroller 2-A, which communicates with various sensors, interfaces (including a spa panel) and load devices of the spa system, as is well known in the art. The load devices include electrically-powered heater 3. The spa controller system 2 is configured to control operation of the heater 3, e.g. in a basis mode of operation to control the heater to turn on/off, or to modulate the current supplied to the heater, to reach a set water temperature and then maintain the water at the set temperature.

The smart heater 3 includes an embedded client authentication integrated circuit (IC) 3-A, and resistive heater element 3-B. Suitable authentication ICs are commercially available, e.g., Microchip ATSHA204A, STMicroelectronics STSAFE-A110, and Analog Devices/Maxim Integrated DS28C16.

In an exemplary embodiment, the spa controller 2 includes a system microcontroller 2-A, and an embedded host authentication IC 2-B. Suitable ICs include those referred to above for the client authentication IC.

In accordance with an aspect of the invention, the client authentication IC 3-A is configured to communicate with the microcontroller 2-A located in the pack 2 and to authenticate the heater 2 with the microcontroller, i.e. that the pack 2 is connected to an authorized, i.e. authentic spa heater. Failure to authenticate the heater 2 with the microcontroller 2-A may result in various consequences, depending on the application. For example, the microcontroller may refuse to operate the heater 2. There will more typically be some type of graceful degradation to allow the user to continue using the spa in the case where the connection between the pack 2 and the heater authentication IC is broken. The microcontroller may also limit the spa water temperature to a lower limit, e.g. 80 degrees, no matter the user set temperature. The heater 3 may typically always be allowed to operate in some fashion regardless of authentication to perform safety issues, such as freeze protection. In one embodiment, the microcontroller 2-A queries the heater 2 only at system startup. In other embodiments, the microcontroller 2-A may be programmed to query the heater 2 more frequently.

As shown in FIGS. 1 and 2, the Pack 2 sends a challenge message 12 to the spa heater 3 and receives a response from the spa heater 3. In this embodiment, the spa system employs two authentication ICs. The first is client authentication IC 3-B, installed in the housing of the smart heater and connected to the Pack 2, in this embodiment by a serial interface 10. The second authentication IC 2-B is added/connected to the pack's PCB (printed circuit board).

An encryption key is programmed into both authentication ICs. This key cannot be read back. An encryption key is a fixed, unique sequence of bits that is programmed into the authentication ICs. It is kept secret from the outside world and cannot be read back (retrieved, extracted) from the ICs. This key is used by the authentication ICs in their internal calculations. Knowledge of the encryption key could allow others to build counterfeit smart heaters. The length of the key is dependent on the IC used, e.g., 256 bits (32 bytes) long, although shorter or longer keys may be used depending on the application.

The microcontroller 2-A generates a 'challenge' data stream 12 and sends it to the smart heater 3. The 'challenge' data stream is just a stream of bytes, dependent on the chip and algorithm used. It has no real meaning and is often just a stream of numbers.

The client authentication IC 3B in the heater 3 computes a response 14 using the encryption key and sends it to the spa pack 2. The response 14 is the result of a computation by the authentication IC 3B using the challenge data, the embedded encryption key, and possibly other information known by the system. An example response is the output of an SHA-256 hash function performed on the input data.

The microcontroller 2-A sends the challenge and response to its local host authentication IC 2-B. The local host authentication IC 2-B computes its own response and compares it to the response from the heater client authentication IC 3-B. Alternatively, the comparison could be done by an algorithm programmed into the microcontroller 2-A.

The local host authentication IC 2-B reports to the microcontroller 2-A a successful authentication if the responses match, a failure otherwise. A successful authentication results in enabling the smart heater operation with the spa pack 2 and spa system, so that the spa pack may deliver current to the heater 3 as called for. The result of the overall authentication operation is a notification to the spa pack 2 that the heater 3 is either a valid or authentic smart heater or not. What the spa pack 2 does with this information will depend on the application. One possible result is that the spa pack may not simply refuse to operate the heater. The user will be notified as to the failure of the authentication, and may be provided with a way to at least partially use the heater. For example, the heater might only be run for 30 minutes before prompting the user for another override. Another option is that the maximum temperature the spa can heat to is limited to a lower value, e.g. 80 degrees. The output of the authentication process is a process for the spa controller 2 to identify counterfeit heaters and take appropriate action as determined by the spa implementation.

In an exemplary embodiment, the heater authentication IC 3-A is mounted to a small PCB within an enclosure 3-E (FIG. 3), which also encloses terminals 3-C for the resistive element 3-B. The wiring for interface 10 is passed into the enclosure 3-E and communicates with IC 3-A. The enclosure is typically potted with epoxy. In other embodiments, the IC 3-A may be mounted to other heater structures.

Figure 4:
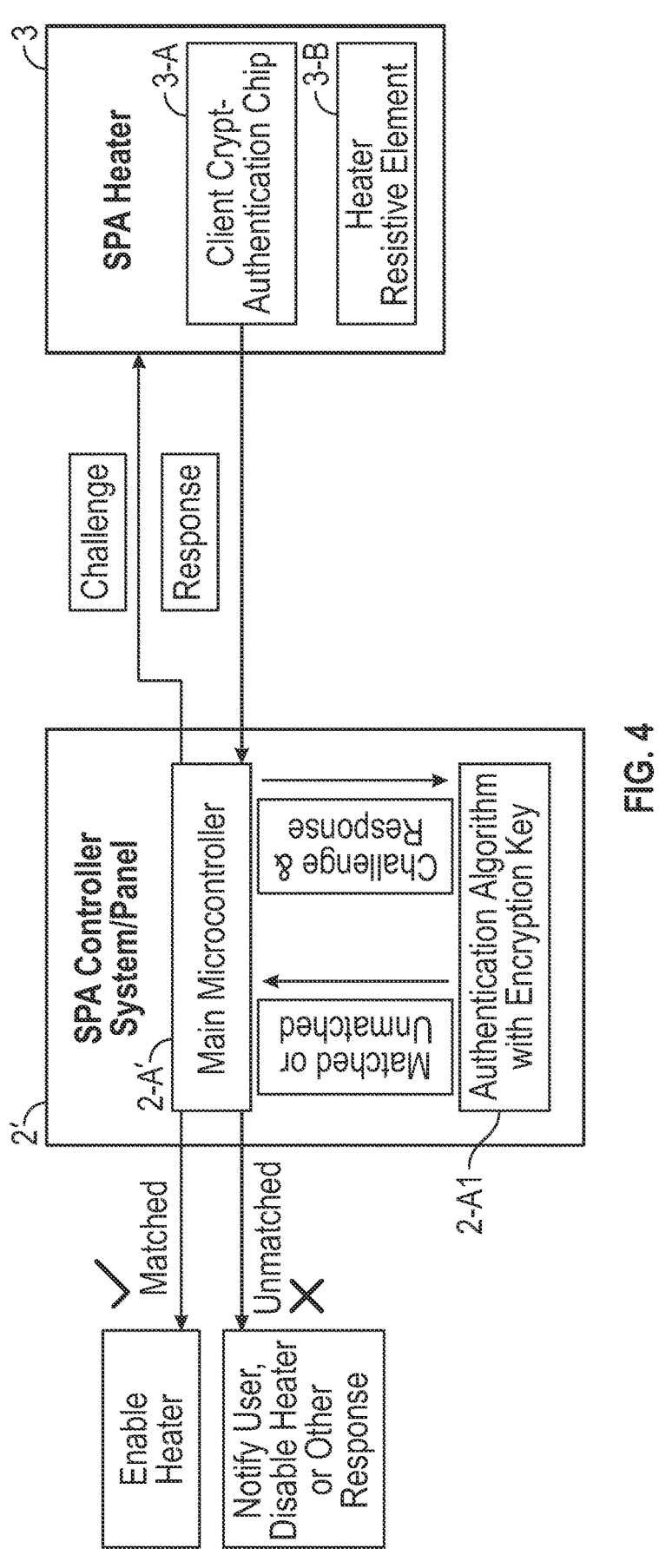
FIG. 4 is a diagrammatic schematic view illustrating an alternative embodiment of a spa control system employing a smart heater in accordance with aspects of the invention.

FIG. 4 illustrates an alternate embodiment of a spa controller 2' for controlling a smart spa heater 3. This embodiment is similar to the embodiment of FIGS. 1-3, except that the spa controller 2' omits the authentication IC 2-B. The functions of the IC 2-B are instead performed by the main microcontroller 2-A' which includes an authentication algorithm 2-A1 including the encryption key. In other respects, the function of the system of FIG. 4 is similar to the function of the system of FIGS. 1-3.

Although the foregoing has been a description and illustration of specific embodiments of the subject matter, various modifications and changes thereto can be made by persons skilled in the art without departing from the scope and spirit of the invention.

What is claimed is:

1. An electric heater system for a bathing installation, comprising:
   a heater housing;
   a resistive heater element disposed within the heater housing;
   a terminal set electrically connected to the resistive element and configured for application of electrical power to the resistive element;
   a communication interface;
   a client authentication integrated circuit (IC) connected to the communication interface;
   and wherein the client authentication IC is configured to receive an authentication query from an electronic bathing installation controller through said communication interface and generates an authentication response for delivery to said bathing installation controller through said communication interface in response to the received authentication query;
   a printed circuit board (PCB) within an enclosure attached to the heater housing, the client authentication IC mounted to the PCB, and which housing also encloses the terminal set, and wherein said communication interface is passed into the enclosure and communicates with the client authentication IC.

2. The electric heater system of claim 1, wherein the client authentication IC includes an encryption key.

3. The electric heater system of claim 2, wherein the client authentication IC generates said authentication response using the encryption key.

4. A spa controller system operating to control operation of a water heater for a spa to heat spa water, comprising:
   a microcontroller configured to communicate with one or more sensors and interfaces, and is electrically connected to load devices of the spa, the load devices including the water heater;
   wherein the spa controller system controls operation of the water heater in a basic mode of operation to control the water heater to turn on/off, or to modulate electrical current supplied to the heater, to reach a set spa water temperature and then maintain the spa water at the set temperature;
   wherein the spa controller system is configured to generate an electronic host authentication query for transmission to said water heater through one of said interfaces, and to receive heater authentication responses from the water heater in response to the host authentication query.

5. The spa controller system of claim 4, further comprising a host authentication IC, and wherein the host authentication IC includes an encryption key.

6. The spa controller system of claim 5, wherein the host authentication IC generates a spa authentication response using the encryption key, and wherein the spa controller system compares a received heater authentication response to the spa authentication response and authenticates said water heater if the received heater authentication response matches the spa authentication response, and if the heater authentication response does not match the spa authentication response, the spa controller system limits operation of the water heater so that heating of the spa water is limited to a low limit below a user temperature set point, or operates the water heater for a limited time interval, while allowing operation of the water heater to perform freeze protection.

7. The spa controller system of claim 4, wherein:
   the microcontroller comprises an authentication algorithm and an encryption key, and
   the microcontroller is configured to generate the host authentication query utilizing the encryption key; and
   wherein the microcontroller is configured to generate a spa authentication response using the encryption key, and to compare a received heater authentication response to the spa authentication response and to authenticate said water heater if the received heater authentication response matches the spa authentication response, and if the heater authentication response does not match the spa authentication response, to limit operation of the water heater so that heating of the spa water is limited to a low limit below a user temperature set point, or to operate the water heater for a limited time interval, while allowing operation of the water heater to perform freeze protection.

8. The spa controller system of claim 4, wherein the interfaces include a serial interface over which the host authentication query is transmitted.

9. A bathing installation system comprising:

a controller system including a microcontroller, said controller system configured to communicate with one or more sensors, and interfaces, and is electrically connected to load devices of the bathing installation, the load devices including a water heater connected to the controller through one of said interfaces; and wherein the controller system is configured to generate a host authentication query for transmission to said water heater through said one of said interfaces, and to receive heater authentication responses received in response to the host authentication query; and the water heater, comprising:

a heater housing:

a resistive heater element;

a terminal set electrically connected to the resistive element and configured for application of electrical power to the resistive element;

a communication interface;

a client authentication integrated circuit (IC); and wherein the client authentication IC receives the authentication query from the controller and to generates a heater authentication response in response to the received authentication query.

10. The bathing installation system of claim 9, wherein the client authentication IC includes an encryption key, and the client authentication IC is configured to generate said heater authentication response using the encryption key.

11. The bathing installation system of claim 9, wherein the controller system includes a host authentication IC and an encryption key, and the host authentication IC is configured to generate a host authentication response using the encryption key, and the controller is configured to compare a received heater authentication response to the host authentication response and to authenticate said heater if the received heater authentication response matches the host authentication response, and if the heater authentication response does not match the spa authentication response, to limit operation of the water heater so that heating of the spa water is limited to a low limit below a user temperature set point, or to operate the water heater for a limited time interval, while allowing operation of the water heater to perform freeze protection.

12. The bathing installation system of claim 11, wherein the controller system enables normal operation of the heater if the received heater authentication response matches the host authentication response, and, if the heater authentication respond does not match the host authentication response, generates a notification to a bathing installation user that the heater is not an authentic heater.

13. The bathing installation system of claim 9, wherein:

the microcontroller includes an authentication algorithm and an encryption key, and the microcontroller is configured to generate the host authentication query utilizing the encryption key.

14. The bathing installation system of claim 13, wherein the controller system enables normal operation of the heater if the received heater authentication response matches the host authentication response, and, if the heater authentication response does not match the host authentication response, generates a notification to a bathing installation user that the heater is not an authentic heater, and limits operation of the water heater so that heating of the spa water is limited to a low limit below a use temperature set point, while allowing operation of the water heater to perform freeze protection.

15. The bathing installation system of claim 9, wherein said one of said interfaces includes a serial interface over which the host authentication query is transmitted.

* * * * *